Jan. 10, 1950     B. MEZZADRI     2,493,988
SAFETY PIN
Filed April 2, 1947
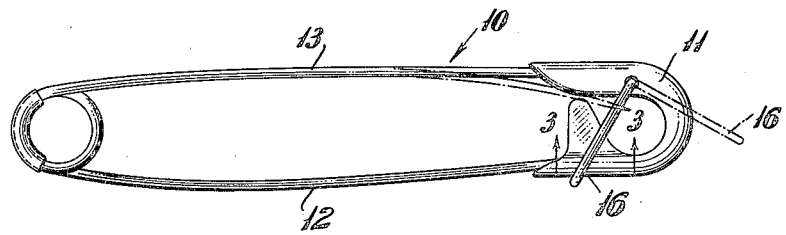
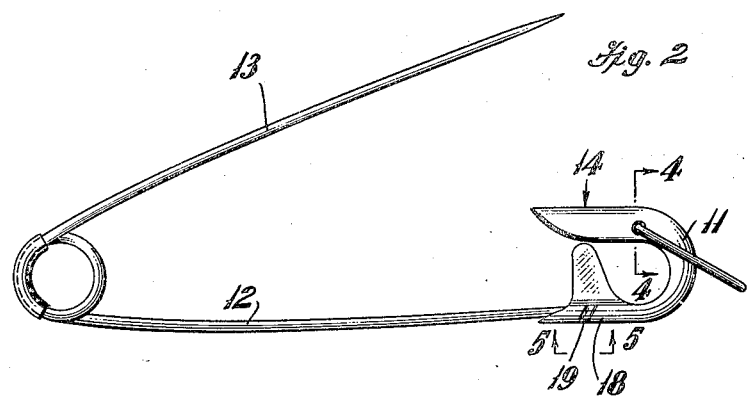
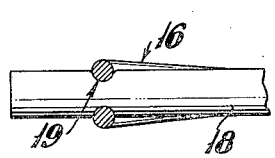
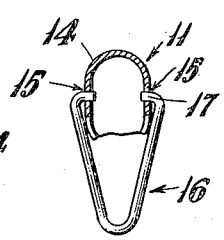
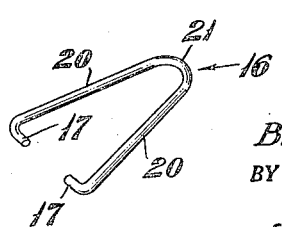
INVENTOR.
Bruno Mezzadri
BY F. Ledermann
ATTORNEY Patented Jan. 10, 1950

2,493,988

UNITED STATES PATENT OFFICE 2,493,988

SAFETY PIN

Bruno Mezzadri, New York, N. Y.

Application April 2, 1947, Serial No. 738,796

1 Claim. (Cl. 24—157)

This invention relates to safety pins, and aims to provide certain new and useful improvements whereby inadvertent opening of the pin at any time, particularly while being worn, is prevented.

Another object of the invention is the provision of positive locking means for a safety pin, to prevent inadvertent opening of the pin, and which is readily manipulatable to move the same from the locking position to the releasing position in which the pin may be opened.

Still another object of the invention is the provision of means for releasably locking the said locking means in the locking position of the latter.

The above and other objects will become apparent in the following description, wherein characters of reference refer to like-numbered parts in the accompanying drawing. It is to be noted that the drawing is intended for the purpose of illustration only, and that it is neither desired nor intended to limit the invention necessarily to the exact details of construction shown excepting insofar as such details may be deemed essential to the invention.

Referring briefly to the drawing, Fig. 1 is a view showing a safety pin provided with the instant invention, the latter being in position for locking the pin against inadvertent opening.

Fig. 2 is a view of the safety pin of Fig. 1 in open condition, with the locking means in released position.

Fig. 3 is a sectional view taken on the line 3—3 of Fig. 1.

Fig. 4 is a sectional view taken on the line 4—4 of Fig. 2.

Fig. 5 is a view taken on the line 5—5 of Fig. 2.

Fig. 6 is a perspective view of the pivoted locking member per se.

Referring in detail to the drawing, the numeral 10 indicates a safety pin which includes the head or shield 11, the fixed back member 12, and the movable front member, or pin proper, 13.

In the opposed walls of the nose 14 of the shield 11, aligned openings or holes 15 are provided at a position near but spaced forward from the base of the nose. A substantially triangularly shaped locking member 16 is formed of a single length of resilient wire or the like, having the base of the triangle split to provide axially aligned projections 17. The member 16 is mounted on the shield 11 by inserting of the projections 17 in the holes 15 in an obvious manner, and the member 16 is thus pivotal about the axis of the projections 17 and possesses inherently a degree of resiliency.

In the back 18 of the shield 11, rounded grooves 19 in parallel relationship with each other and on a line directed toward the axis of the holes 15, are cut into the opposed walls of the back 18 of the shield.

The member 16 is shown in broken lines in Fig. 1 in the released position, whence the pin 13 may be readily moved out of the shield in the usual manner, into open position. To lock the pin in the closed position shown in Fig. 1, the member 16 is swung with a slight amount of force into the position shown in full lines in Fig. 1. As the opposed arms 20 of the member 16 approach the opposed grooves 19, those portions of the arms adjacent the rounded apex 21 of the member 16 ride frictionally over the surface of the back 18, and as the arms become aligned with the grooves they snap into the grooves and register releasably therein. With the member 16 in the locking position shown in full lines in Fig. 1, if an attempt is made to open the safety pin by pressing back the pin proper 13, as shown in broken lines, the arms of the member 16 provide an obstruction to swinging the pin 13 out of the shield. Hence, it is apparent that the pin cannot be opened with the member 16 in locking position.

To move the member 16 out of the locking position, a slight pressure is applied, as by the finger nail, against the apex 21 of the member 16, to disengage the arms 20 from the grooves 19, and when the member 16 is swung clear, as, for instance, the position shown in broken lines in Fig. 1, the pin 13 may be swung clear of the shield.

Obviously, modifications in form and structure may be made without departing from the spirit or scope of the invention.

I claim:

A safety pin including a shield at the head of the pin, a back member fixed to and extending from said shield at the back of the shield, and a front pointed member adapted to be moved to bring its free end into the shield behind the nose of the shield, said nose having aligned holes through the side walls thereof, a yoke-shaped member having aligned projections on the free ends of the arms thereof, said projections extending toward each other and registering in said holes to secure said yoke-shaped member to said shield, the back of said shield having opposed grooves in the walls thereof, said nose and said back of said shield being mutually parallel, said grooves being spaced forward near the free end of said back with respect to an imaginary line drawn through the axis of said holes at right angles to said nose and back, said yoke possessing a degree of resiliency and having a length slightly less than the distance between the outer surface of said back between said grooves and said holes, the axes of said grooves lying in an imaginary plane which is common with the common axis of said holes, said yoke-shaped member lying in said imaginary plane when in locking position and having said arms thereof registering in said grooves, the pointed end of said front pointed member extending through said imaginary plane when said pin is closed.

BRUNO MEZZADRI.

REFERENCES CITED

The following references are of record in the file of this patent:

UNITED STATES PATENTS

| Number | Name | Date |
|---|---|---|
| 355,535 | Junkins | Jan. 4, 1887 |
| 825,579 | Bryant | July 10, 1906 |
| 985,527 | Happich | Feb. 28, 1911 |